United States Patent [19]

Schumaker, II et al.

[11] 3,707,834
[45] Jan. 2, 1973

[54] HEIGHT CONTROL DEVICE FOR A HARVESTER CUTTER

[76] Inventors: Gustav Schumaker, II; Gunter Schumaker, borh of Haus Nr. 51, 5231 Eichelhardt, Germany

[22] Filed: Oct. 21, 1970

[21] Appl. No.: 82,639

[30] Foreign Application Priority Data

Oct. 24, 1969  Germany.....................P 19 53 644.8

[52] U.S. Cl. ...............................................56/208
[51] Int. Cl. ...............................................A01d 67/00
[58] Field of Search...............................56/208–217

[56] References Cited

UNITED STATES PATENTS

| | | | |
|---|---|---|---|
| 3,509,701 | 5/1970 | Clarke..................................56/208 |
| 2,842,925 | 7/1958 | Allen..................................56/208 X |
| 3,088,264 | 5/1963 | Sallee..................................56/208 X |
| 3,402,540 | 9/1968 | Karlson et al. ..........................56/208 |
| 3,417,553 | 12/1968 | Hubbard............................56/208 X |
| 3,461,655 | 8/1969 | von der Lely ..........................56/208 |

Primary Examiner—Russell R. Kinsey
Attorney—Steinberg & Blake

[57] ABSTRACT

A height adjustment device for a harvester cutter has a control valve controlling a piston and cylinder for raising and lowering the cutter, a height control member which is adjustable for preselecting the ground clearance of the cutter and means responsive to the adjustment of the height control member and the position of the cutter for discontinuing the supply of pressure fluid to the piston and cylinder when the cutter has been lowered to a preselected position determined by the adjustment of the height control member.

In one arrangement, these means comprise a check valve between the control valve and the piston and cylinder, and in another arrangement a linkage for actuating the control valve.

6 Claims, 3 Drawing Figures

PATENTED JAN 2 1973 3,707,834

INVENTORS
GUSTAV SCHUMACHER II AND
BY GUNTER SCHUMACHER

HEIGHT CONTROL DEVICE FOR A HARVESTER CUTTER

The present invention relates to a semi automatic device for adjusting the height of cut of a cutter of a harvester, e.g. of a combine harvester.

It is in practice a problem to guide the heavy cutter table of a combine harvester relative to the ground in such a manner that on the one hand it passes as close as possible over the ground, which e.g. is necessary for picking up lying crops without loss, but on the other hand striking of the cutter against the ground, which leads to damage to the machine and to loading the threshing mechanism with the earth picked up, is avoided.

The cutter, which in most cases is hydraulically adjustable in height, is controlled by the driver by means of a control valve. The driver is required to do too much if he has to compensate for every irregularity in the ground, which requires a different height adjustment of the cutter, by appropriate actuation of the control valve, particularly since his view is hindered by dust and by the chaff from the cutter to such an extent that he is unable to observe the height of the cutter from the driving seat.

One solution to this problem is to mount the cutter resiliently, so that the cutter can slide over the ground and if necessary can deflect upwardly as it runs over an obstruction. This resilient mounting has been developed in different forms.

In one case a compression spring is provided between the cutter and piston and cylinder for effecting the adjustment of the height of the cutter, the compression spring being so loaded that when the cutter runs against an obstruction or a rise in the ground it is urged upwardly by the spring.

In another case a pressure reservoir is arranged in the piston and cylinder or separate therefrom and connected thereto by a pressure duct. The pressure reservoir maintains the pressure medium of the piston and cylinder under pressure so that the cutter mechanism can deflect resiliently upwardly.

Since the cutter mechanism of a combine harvester is preferably so arranged that it can be adjusted lower than the imaginary straight lines joining the points at which the front and rear wheels of the machine bear against the ground, it can happen that after the cutter has been laid on the ground the spring element presses the pressure medium from the cylinder by means of the piston if the driver, not having noticed that the cutter is already lying on the ground, adjusts the control valve to "lower". The spring is thereby unstressed and can no longer urge the cutter upwardly if necessary, and is therefore ineffective.

With machines provided with the above-mentioned pressure reservoir, when the cutter is laid on the ground and the control valve opened, the pressure medium is discharged from the hydraulic cylinder and so increases the required spring force.

In order to indicate to the driver when ground contact occurs, height adjustment indicators are incorporated to enable the driver, from his high driving position, to check the height adjustment of the cutter. Moreover, by incorporation of complicated control devices on the underside of the cutter, attempts have been made to provide a fully automatic height control.

In the first case, after each height adjustment of the cutter mechanism, which is necessary at each turn at the end of a field, the driver must again effect correct height setting, which requires considerable attention just when he is fully loaded with other tasks. In the second case, to fulfil their purpose the control elements must be mounted under the cutter, which gives rise to the danger of damage by impact against obstructions, which not infrequently leads to the control elements being put out of action. Moreover, these control elements respond to every small irregularity in the ground, which results in continuous actuation of the device. This is very undesirable because of the high rate of wear and the overloading of the hydraulic system. Furthermore, these control elements only operate when the cutter is guided very close above the ground. These elements do not allow the adjustment of a constant high stubble height, which is often required.

Experience has shown that it is sufficient if the spring force of the spring element is fully available to the cutter on contact with the ground, so that the cutter can resiliently absorb small irregularities in the ground. It is only necessary that the control element should no longer be set to "lower" after a particular height adjustment, since otherwise the above-mentioned unstressing of the spring element occurs and it no longer fulfils its function. Moreover it is desirable with, for example, crops which are not lying to allow the stubble to remain higher and to obtain this pre-selected height uniformly over the whole field.

It is an object of the present invention to develop a device which firstly enables the pre-selected height setting of the cutter with certainty and without attention by the driver to be obtained after each height adjustment of the cutter, and secondly to prevent the spring element on or in the cylinder of the cutter from discharging the pressure medium, by too long opening of the control valve, to such an extent that the spring force intended for balancing the cutter is released.

The invention will be more readily understood from the following description of two embodiments thereof given by way of example with reference to the accompanying diagrammatic drawings, in which.

Figure 1:
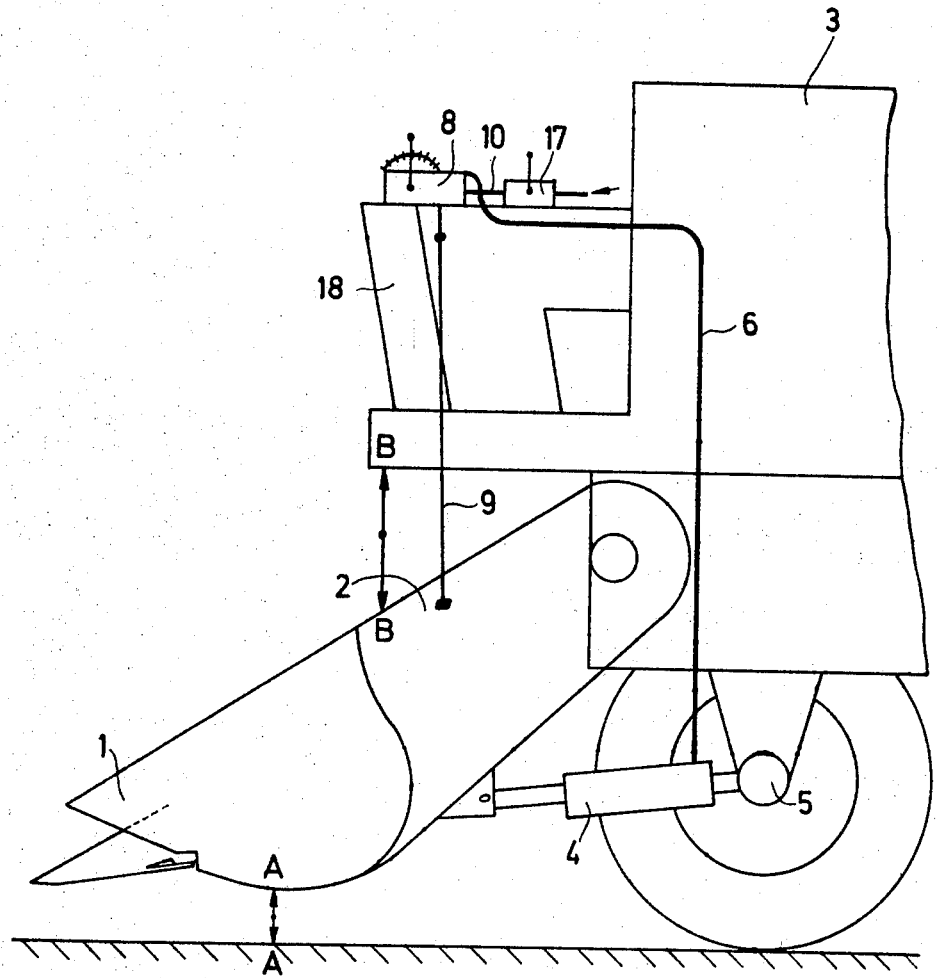
FIG. 1 shows a partial side view of a combine harvester.
Figure 2:
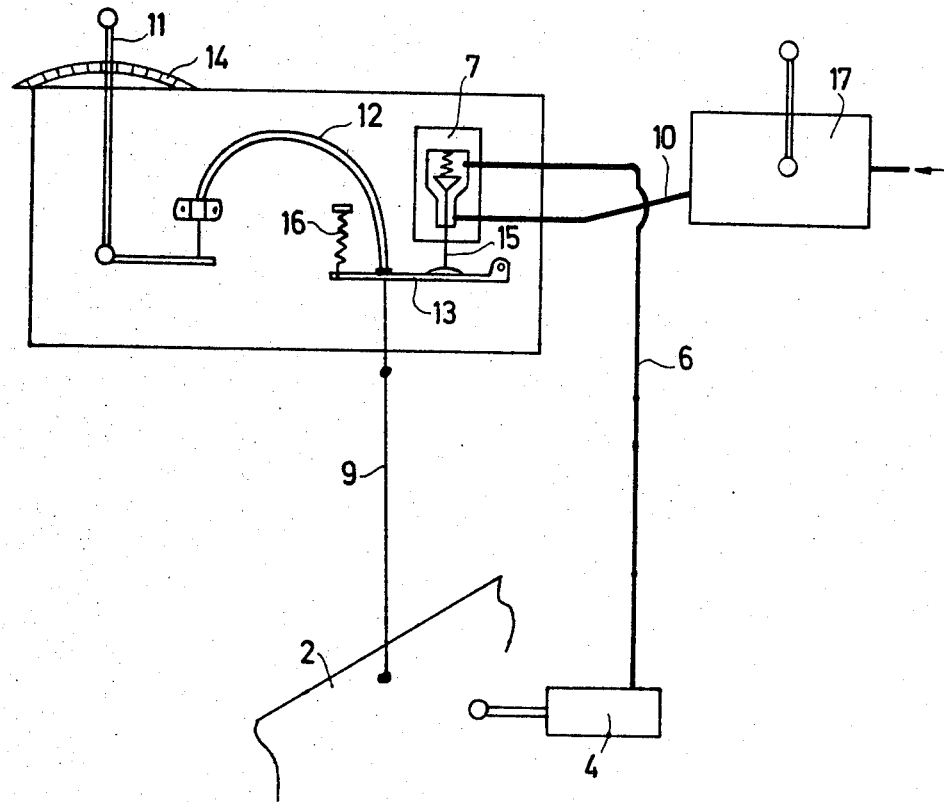
FIG. 2 shows an adjustment device for adjusting the cutting height of the harvester of FIG. 1.

As shown in FIG. 1, the cutter 1 is pivotally connected with the inclined conveyor 2 to the combine harvester 3. A hydraulic piston and cylinder 4, which is pivotally supported at one end at about the height of the axle 5 on the combine harvester 3 and at its other end is pivotally secured to the inclined conveyor 2, is provided for adjusting the spacing A—A between the cutter and the ground (FIG. 1). The hydraulic piston and cylinder 4 can be extended or retracted by the pressure of a hydraulic pump (not shown) under the control of the driver by means of a control valve 17. From the control valve 17, the pressure medium flows through a duct 10, a switchable check valve 7 (FIG. 2) and an operating duct 6 to the hydraulic piston and cylinder 4. The valve 7 is secured to a part of the combine harvester which is fixed, preferably to a driving platform 18. The valve 7, together with a switching device described in more detail below, forms an assembly unit 8 and is actuated by means of an actuating member 9 which is fixed to the inclined conveyor 2. The above-mentioned assembly unit 8 is shown in greater detail in FIG. 2 and comprises the valve 7 and an adjustment lever 11 which, through a Bowden cable 12 and the actuating member 9, adjusts a switch lever 13 with respect to the spacing B—B between the inclined conveyor 2 and the driving platform 18.

If, for example, the spacing A—A is adjusted to 100 millimeters by means of the adjustment lever 11, which spacing can be pre-selected with the help of a scale 14, then actuating member 9 secured at one end to the inclined conveyor 2, through the Bowden cable 12 connected therewith, moves the switching lever 13 in the downward direction as the required spacing A—A is obtained by a lowering of the cutter 1. The valve 7, opened by the tension spring 16 by means of the lever 13 and a valve rod 15, is thereby closed and the return flow of the pressure medium from the hydraulic cylinder 4 is blocked. The spacing A—A can be reduced no further, even if the driver still holds the control valve 17 in its open position. With the help of the adjustment lever 11 and the scale 14, it is thus possible to adjust to any required spacing A—A.

If the control valve 17 is now again moved by the driver to "lift" the pressure medium, through the duct 10, exerts pressure on the valve member of the valve 7 to open it and flows through the valve in the direction of the hydraulic cylinder 4, and the hydraulic cylinder 4 again raises the cutter. The spacing B—B is thereby again reduced, the Bowden cable 12 releases the lever 13 and the latter is drawn upwardly by the tension spring 16, so that the valve rod 15 again opens the valve 7.

The above-described device represents only one embodiment of the invention. In practice it is possible to obtain the required effect by widely differing devices. Thus, for example, it is possible to mount the valve 7 on the inclined conveyor 2 and to actuate it by means of a connecting rod from the adjustment lever 11 secured to a fixed part of the combine harvester. Also, it is possible to make the device remotely controllable or to incorporate it in the hydraulic cylinder.

Figure 3:
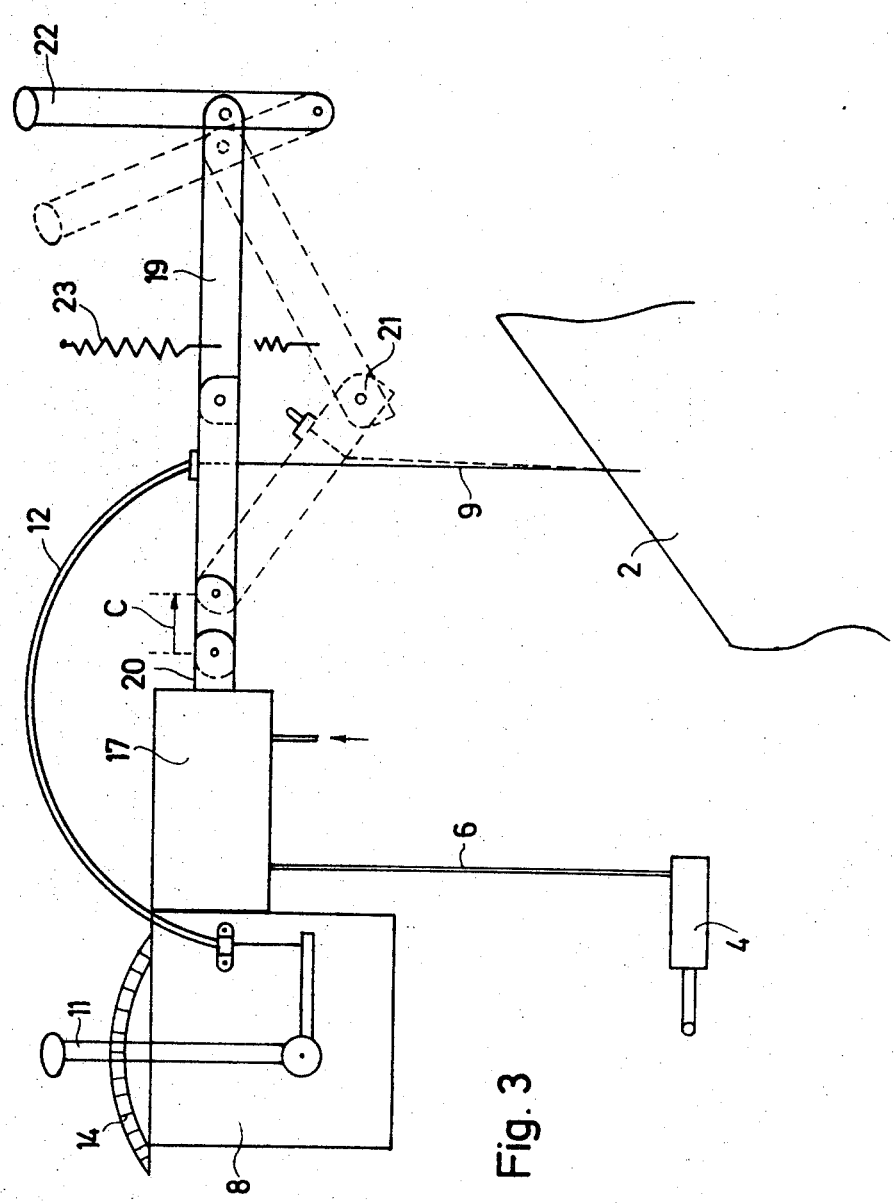
FIG. 3 shows a modification of the adjustment device of FIG. 2.

In another embodiment of the invention, shown in FIG. 3 an actuating member 9 secured to the inclined conveyor 2, by means of an intermediate adjustment device 8, operates the control valve 17 so that the latter is brought at the instant of the "lower" setting to a null position where the spacing A—A pre-selected by the setting lever 11 and readable on the scale 14 is obtained by lowering of the cutter. This so to speak forced null position must be reached when the driver maintains the control valve 17 in the "lower" position.

A linkage 19 actuating the control valve 17 is bent into the position shown in broken lines by the Bowden cable 12 and the actuating member 9 actuating the Bowden cable 12 when the pre-selected spacing A—A is reached, so that a slide 20 of the control valve 17 is drawn in a direction of arrow C to the null position. In this way the return flow of the pressure medium from the hydraulic cylinder 4 is blocked.

If the hand lever 22 is again pulled, i.e. brought into the "raised" position, the slide 20 is again drawn in the direction of arrow C and the control valve is switched to "raise". The actuating rod 9, through the Bowden cable 12, unloads the linkage 19 and the latter is again drawn by the tension spring 23 into a straight condition. The pivot 21 of the linkage 19 is so formed that the linkage 19 can be bent downwardly (as shown in broken lines) but not upwardly.

We claim:

1. In a harvester, a cutter and a support means supporting said cutter for elevational movement, a piston and cylinder operatively connected between said support means and cutter for raising and lowering said cutter, a manually operable control valve for controlling the supply of pressure fluid to said piston and cylinder, conduit means operatively connected to and extending between said control valve and piston and cylinder for directing pressure fluid therebetween, a height control member which is manually adjustable for preselection of the ground clearance of said cutter, said control member being carried by said support means, and flow control means operatively connected to said control member and said cutter for responding to the adjustment of said height control member and the position of said cutter for automatically discontinuing the flow of pressure fluid to said piston and cylinder, and thereby discontinuing the lowering of said cutter, when said cutter has been lowered to a height preselected by adjustment of said height control member, said flow control means being operatively connected to said conduit means for controlling the flow of pressure fluid therethrough.

2. The combination of claim 1, wherein said flow control means comprises a check valve communicating with said conduit means for controlling the flow of the pressure fluid between said control valve and said piston and cylinder.

3. The combination of claim 2, wherein said check valve comprises a valve member operatively connected with the remainder of said flow control means for moving automatically into an open position on operation of said piston and cylinder by said manually operable control valve to raise said cutter.

4. The combination of claim 2, wherein said flow control means connects said check valve to said cutter for controlling said check valve in response to adjustment of said height control member.

5. A height adjustment device as claimed in claim 1, comprising means connecting said control valve to said cutter for closing said control valve on lowering of said cutter to said preselected height.

6. A height adjustment device as claimed in claim 5, and further comprising an actuating member for actuating said control valve, said connecting means comprising a linkage connecting said actuator to said control valve, means connecting said linkage to said cutter for deflecting said linkage to operate said control valve in response to movement of said cutter, and means connecting said linkage to said height control member for adjusting the deflection of said linkage in accordance with said preselected height.

* * * * *

UNITED STATES PATENT OFFICE
CERTIFICATE OF CORRECTION

Patent No. 3,707,834  Dated January 2, 1973

Inventor(s) Gustav Schumacher II, Gunter Schumacher

It is certified that error appears in the above-identified patent and that said Letters Patent are hereby corrected as shown below:

In the introduction, after the heading "Inventors:" change "Gustav Schumaker II, Gunter Schumaker, borh" to -- Gustav Schumacher II, Gunter Schumacher, both --.

Signed and sealed this 5th day of March 1974.

(SEAL)
Attest:

EDWARD M. FLETCHER, JR.
Attesting Officer

C. MARSHALL DANN
Commissioner of Patents